United States Patent
Taisne et al.

(10) Patent No.: US 6,841,613 B1
(45) Date of Patent: Jan. 11, 2005

(54) WATER RE-DISPERSIBLE GRANULES COMPRISING AN ACTIVE MATTER IN LIQUID FORM

(75) Inventors: Laurent Taisne, Paris (FR); Jean-Pierre Hecaen, Stains (FR)

(73) Assignee: Rhodia Chimie, Boulogne Billancourt (FR)

( * ) Notice: Subject to any disclaimer, the term of this patent is extended or adjusted under 35 U.S.C. 154(b) by 0 days.

(21) Appl. No.: 09/830,766

(22) PCT Filed: Nov. 2, 1999

(86) PCT No.: PCT/FR99/02667

§ 371 (c)(1),
(2), (4) Date: Jul. 9, 2001

(87) PCT Pub. No.: WO00/26280

PCT Pub. Date: May 11, 2000

(30) Foreign Application Priority Data

Oct. 30, 1998 (FR) .............................. 98 13682

(51) Int. Cl.$^7$ .............................................. C08L 37/00
(52) U.S. Cl. ........................................ 524/549
(58) Field of Search .......................................... 524/549

(56) References Cited

U.S. PATENT DOCUMENTS 4,748,196 A * 5/1988 Kuroda et al. ................. 524/43
5,372,804 A 12/1994 Khoshdel et al. ............. 424/59
6,465,414 B1 10/2002 Guerin ......................... 510/441
6,624,136 B2 9/2003 Guerin ......................... 510/438

FOREIGN PATENT DOCUMENTS

| WO | WO 97/15385 | 5/1997 |
| WO | WO 97/15386 | 5/1997 |
| WO | WO97/15616 | 5/1997 |
| WO | WO97/15617 | 5/1997 |

* cited by examiner

Primary Examiner—Bernard Lipman

(57) ABSTRACT

The invention concerns water re-dispersible granules obtainable by drying an emulsion comprising an active matter in the form of a hydrophobic, a non-ionic surfactant selected among polyoxyalkylene derivatives, and a water soluble or water dispersible compound selected among polymers: (i) obtained by polymerising an ethylenically unsaturated carboxylic acid, or anhydride monomer (I), and an ethylenically unsaturated carboxylic acid polyoxyalkylene ester (III), and optionally an ethylenically unsaturated linear or branched hydrocarbon monomer (II); or obtained by polymerising said monomer (I), and a vinyl type monomer (II'), comprising at least a $C_2$–$C_{10}$ linear or branched, or cyclic aliphatic radical; (ii) obtained by polymerising at least a monomer of formula (I) comprising a hydrophobic graft; (iii) polypeptides of natural or synthetic origin; (iv) highly depolymerised polysaccharides comprising at least a hydrophobic graft.

20 Claims, No Drawings

WATER RE-DISPERSIBLE GRANULES COMPRISING AN ACTIVE MATTER IN LIQUID FORM

This application is an application under 35 U.S.C. Section 371 of International Application Number PCT/FR99/02667 filed on Nov. 2, 1999.

The subject of the present invention is water-redispersible solids comprising an active substance in liquid form, their method of preparation and their use. Preferably, the solids are granules, and more particularly objects whose size is a few millimeters along the side. However, the invention may cover powders.

In the text which follows, reference will be made only to granules knowing that the invention is not limited to this form.

In certain sectors, such as for example the food, cosmetics, paints or agrochemical sectors, it is necessary to prepare formulations from active substances in the form of a hydrophobic liquid. One of the formulation possibilities is to prepare oil-in-water emulsions of such substances.

However, problems linked to the storage stability of these emulsions are encountered, both from the point of view of the stability of the emulsion itself (creaming, flocculation, ripening and coalescence), but also of the stability of the active substance (degradation by hydrolysis for example).

Finally, the fact should not be neglected that to be capable of being easily handled and pumped, such formulations have relatively low contents of active substance and a large quantity of water.

It has thus been proposed to form such emulsions in the form of solids containing high concentrations of active substance initially in the form of a hydrophobic liquid.

These solids are obtained by drying an emulsion comprising the active substance in the form of a hydrophobic liquid, as well as an appropriate surfactant system.

For example, an appropriate surfactant system consists of a nonionic surfactant of the polyoxyalkylenated derivative type, and a water-soluble compound chosen from polyelectrolytes belonging to the family of weak polyacids.

The object of the present invention is an improvement of the method described above, whose advantage is nevertheless not called into question.

Thus, the subject of the present invention is water-redispersible granules which can be obtained by carrying out the following steps:
an emulsion, in water, of at least one active substance, at least one nonionic surfactant, and at least one water-soluble or water-dispersible compound is prepared;
the emulsion thus obtained is dried.
The granules are furthermore such that:
the active substance is in the form of a hydrophobic liquid,
the nonionic surfactant is chosen from polyoxyalkylenated derivatives,
the water-soluble or water-dispersible compound is:
(i) at least one polymer obtained by polymerizing at least one monomer (I), at least one monomer (III) and optionally at least one monomer (II) or at least one monomer (I) and at least one monomer (II'), the said monomers corresponding to the following:
(I): ethylenically unsaturated, linear or branched, aliphatic, cyclic or aromatic monocarboxylic or polycarboxylic acid, or anhydride,
(II): ethylenically unsaturated, linear or branched hydrocarbon monomer;
(II'): $(R^2)$ $(R^2)$—C=CH$_2$ (II'); in which formula the radicals $R^2$, which are identical or different, represent a hydrogen atom, a linear or branched aliphatic, or cyclic, saturated or ethylenically unsaturated, $C_2$–$C_{10}$ radical, provided that the two radicals are not hydrogen atoms;
(III): polyoxyalkylenated ester of an ethylenically unsaturated carboxylic acid;
(ii) at least one polymer derived from the polymerization of at least one ethylenically unsaturated, linear or branched, aliphatic, cyclic or aromatic, monocarboxylic or polycarboxylic acid, or anhydride, monomer (I) and comprising, in addition, at least one saturated or unsaturated, aromatic or nonaromatic, hydrophobic $C_4$–$C_{30}$ hydrocarbon graft, optionally interrupted by one or more heteroatoms;
(iii) the polypeptides of natural or synthetic origin, comprising at least one saturated or unsaturated, aromatic or nonaromatic, hydrophobic $C_4$–$C_{30}$ hydrocarbon graft, optionally interrupted by one or more heteroatoms;
(iv) the highly depolymerized polysaccharides comprising at least one saturated or unsaturated, aromatic or nonaromatic, hydrophobic $C_4$–$C_{30}$ hydrocarbon graft, optionally interrupted by one or more heteroatoms.

The granules according to the invention exhibit a better storage stability. Indeed, they are less sensitive to moisture. In addition, the granules have improved castability.

Another advantage of the granules according to the invention is that it is still as easy, or even easier, to redisperse them. Indeed, the granules, because of their composition, are spontaneously redispersed in water to give stable emulsions having a particle size close to that of the initial emulsion.

Quite obviously, the granules according to the present invention are always advantageous in the sense that the concentrations of active substances may be very high, compared with the emulsions, the consequence of which is that a lower quantity of granules will be sufficient.

Furthermore, this forming makes it possible to solve the problem of degradation of the active substance when it is sensitive to hydrolysis.

The present invention also makes it possible to have a preformulation in the form of granules, which can therefore be more easily used than emulsions, for example in the case where the said preformulation is added to a powdered formulation.

Finally, the present invention proposes a solution to the problems of forming liquid products which are usually formulated by absorption on a support. These formulations often do not have a very high concentration of active substance and phase separation can occur between the support and the active substance by migration of the active substance during storage.

However, other advantages and characteristics ill emerge more clearly on reading the description and the example which follows.

As indicated above, the granules according to the invention comprise at least one active substance in the form of a hydrophobic liquid.

All active substances are suitable for the invention insofar as they are provided at room temperature in the form of a liquid which is immiscible or very sparingly miscible in water, or in a form solubilized in an organic solvent.

The expression sparingly miscible is understood to mean active substances whose solubility in water does not exceed 10% by weight.

It should be noted that the present invention may equally well apply to the forming of active substances whose melting point is less than or equal to 100° C., more particularly less than or equal to 80° C. Consequently, the term hydrophobic liquid will also cover, according to the invention, such active substances.

In the text which follows, the expression active substance will be understood to mean either the pure active substance, or the active substance solubilized in an organic solvent, or an organic solvent.

By way of example of active substances in the food sector, there may be mentioned mono-, di- and triglycerides, essential oils, flavorings and colorings.

By way of example of active substances in the cosmetic sector, there may be mentioned silicone oils belonging, for example, to the dimethicone family.

By way of example of active substances suitable for carrying out the invention in the paints sector, there may be mentioned alkyd resins, epoxy resins, blocked or unblocked isocyanates.

In the paper sector, there may be mentioned, by way of example, bonding and water-repellent resins such as alkylketene dimer (AKD) or alkenylsuccinic anhydride (ASA).

In the agrochemical sector, plant-protection active substances may be chosen from the α-cyanophenoxybenzylcarboxylate or α-cyanohalophenoxycarboxylate family, the N-methylcarbonate family comprising aromatic substituents, active substances such as Aldrin, Azinphos-methyl, Benfluralin, Bifenthrin, Chlorphoxim, Chlorpyrifos, Fluchloralin, Fluroxypyr, Dichloruos, Malathion, Molinate, Parathion, Permethrin, Profenofos, Propiconazole, Prothiofos, Pyrifenox, Butachlor, Metolachlor, Chlorimephos, Diazinon, Fluazifop-P-butyl, Heptopargil, Mecarbam Propargite, Prosulfocarb, Bromophos-ethyl, Carbophenothion, Cyhalothrin.

The plant-protection active substances may be used in the presence of conventional additives chosen, for example, from adjuvants which make it possible to increase the efficacy of the active substance, antifoaming agents, anticaking agents, water-soluble or water-insoluble fillers.

In the detergency sector, silicone antifoams may be mentioned as possible active substances.

It is likewise possible to use active substances such as those entering into the composition of lubricants for working or deforming materials, such as cutting, laminating, wiredrawing, deforming and protective fluids. In the case of these lubricants, the active substance may comprise conventional additives in the sector.

The active substance, which is sparingly miscible or immiscible in water, is in general an oil, a derivative of an oil or else a fatty acid ester.

The oils may be chosen from organic oils of animal origin or of plant origin (rape, sunflower, soya bean, flax, hemp, castor-oil plant, and the like), or else inorganic oils (petroleum cuts, naphthenic oils, paraffin oils, and the like).

Suitable derivatives of oils are more particularly products of alcoholysis, more specifically of methanolysis, of these oils.

Among the fatty acid esters, those which are suitable are esters in which the acid portion is derived from fatty acids comprising a saturated or unsaturated, linear or branched, $C_7$–$C_{22}$, preferably $C_{10}$–$C_{22}$, hydrocarbon radical optionally carrying at least one hydroxyl group, and in which the alcohol portion is derived from an alcohol comprising a saturated or unsaturated, linear or branched, $C_1$–$C_{10}$ hydrocarbon radical. The methyl, ethyl, propyl and butyl esters may in particular be used.

Preferably, oils are used.

The active substances may furthermore comprise additives such as lubrication additives, extreme-pressure additives, anticorrosion agents, biocides, bactericides, antifoaming agents and coupling agents.

It should be noted that the active substance may also be chosen from organic solvents or mixtures of such solvents. In such a case, solvents are used which are immiscible or sparingly miscible with water in the sense indicated above. Among the solvents which may be used, there may be mentioned solvents such as in particular those used for cleaning or stripping, such as aromatic petroleum cuts, terpenic compounds such as D-limonene or L-limonene, as well as solvents such as Solvesso®. Also suitable as solvents are aliphatic esters such as the methyl esters of a mixture of acetic, succinic and glutaric acids (mixture of acids which are byproducts of the synthesis of Nylon), oils such as liquid paraffin, and chlorinated solvents.

Finally, as was mentioned above, the active substances may be used in the presence of an organic solvent. More particularly, this solvent is chosen from products which are insoluble in or sparingly miscible with water in the sense indicated above.

For example, there may be mentioned mineral oils, saturated or unsaturated fatty acid mono-, di- and triglycerides; they may also be synthetic or natural triglycerides, as well as the solvents mentioned above.

It is even possible to use, as solvent, vegetable oils such as rapeseed, sunflower, groundnut, olive, walnut, maize, soya bean, linseed, hemp, grapeseed, coconut, palm, cotton seed, babassu, jojoba, sesame or castor oils. Short esters (as $C_1$–$C_4$) of fatty acids comprising 7 to 18 carbon atoms, or vegetable oil esters of pentaerythritol may also be suitable.

Quite obviously, all these lists are given only as a guide and should not be considered to be exhaustive.

The granules in accordance with the invention comprise, in addition, at least one nonionic surfactant chosen from polyoxyalkylenated derivatives.

More particularly, there may be mentioned:

ethoxylated or ethoxy-propoxylated fatty alcohols ethoxylated or ethoxy-propoxylated triglycerides ethoxylated or ethoxy-propoxylated fatty acids ethoxylated or ethoxy-propoxylated sorbitan esters ethoxylated or ethoxy-propoxylated fatty amines ethoxylated or ethoxy-propoxylated di(1-phenylethyl) phenols ethoxylated or ethoxy-propoxylated tri(1-phenylethyl) phenols ethoxylated or ethoxy-propoxylated alkylphenols.

The number of oxyethylene (OE) and/or oxypropylene (OP) units of these nonionic surfactants usually varies from 2 to 100 depending on the desired HLB (hydrophilic/lipophilic balance). More particularly, the number of OE and/or OP units is between 2 and 50. Preferably, the number of OE and/or OP units is between 10 and 50.

The ethoxylated or ethoxy-propoxylated alcohols generally comprise from 6 to 22 carbon atoms, the OE and OP units being excluded from these numbers. Preferably, these units are ethoxylated units.

The ethoxylated or ethoxy-propoxylated triglycerides may be triglycerides of plant or animal origin (such as lard, tallow, groundnut, butter, cotton seed, linseed, olive, fish, palm, grapeseed, soybean, castor, rapeseed, copra or coconut oils), and are preferably ethoxylated.

The ethoxylated or ethoxy-propoxylated fatty acids are esters of fatty acids (such as for example oleic acid, stearic acid), and are preferably ethoxylated.

The ethoxylated or ethoxy-propoxylated sorbitan esters are cyclized sorbitol esters of fatty acids comprising from 10 to 20 carbon atoms, such as lauric acid, stearic acid or oleic acid, and are preferably ethoxylated.

The term ethoxylated triglyceride covers, in the present invention, both the products obtained by ethoxylation of a triglyceride with ethylene oxide and those obtained by transesterification of a triglyceride with a polyethylene glycol.

Likewise, the term ethoxylated fatty acid includes both the products obtained by ethoxylation of a fatty acid with ethylene oxide and those obtained by transesterification of a fatty acid with a polyethylene glycol.

The ethoxylated or ethoxy-propoxylated fatty amines generally have from 10 to 22 carbon atoms, the EO and OP units being excluded from these numbers, and are preferably ethoxylated.

The ethoxylated or ethoxy-propoxylated alkylphenols generally have one or two linear or branched alkyl groups having 4 to 12 carbon atoms. By way of example, there may be mentioned in particular the octyl, nonyl or dodecyl groups.

By way of examples of nonionic surfactants of the group of ethoxy or ethoxy-propoxylated alkylphenols, ethoxylated di(1-phenylethyl)phenols and ethoxy or ethoxy-propoxylated tri(1-phenylethyl)-phenols, there may be mentioned in particular di(1-phenylethyl)phenol ethoxylated with 5 OE units, di(1-phenylethyl)phenol ethoxylated with 10 OE units, tri(1-phenylethyl)phenol ethoxylated with 16 OE units, tri(1-phenylethyl)phenol ethoxylated with 20 OE units, tri(1-phenylethyl)phenol ethoxylated with 25 OE units, tri(1-phenylethyl)phenol ethoxylated with 40 OE units, tri(1-phenylethyl)phenols ethoxy-propoxylated with 25 OE+OP units, nonylphenol ethoxylated with 2 OE units, nonylphenol ethoxylated with 4 OE units, nonylphenol ethoxylated with 6 OE units, nonylphenol ethoxylated with 9 OE units, nonylphenols ethoxy-propoxylated with 25 OE+OP units, nonylphenols ethoxy-propoxylated with 30 OE+OP units, nonylphenols ethoxy-propoxylated with 40 OE+OP units, nonylphenols ethoxy-propoxylated with 55 OE+OP units, nonylphenols ethoxy-propoxylated with 80 OE+OP units.

The redispersible granules according to the invention comprise, in addition, at least one water-soluble or water-dispersible compound chosen from a list of four types of compound.

As indicated above, a first variant of the invention consists in using, as water-soluble or water-dispersible compound, at least one polymer derived from the polymerization of at least one monomer (I), of at least one monomer (III) and optionally of at least one monomer (II), the said monomers corresponding to the following:

T (I): ethylenically unsaturated, linear or branched, aliphatic, cyclic or aromatic monocarboxylic or polycarboxylic acid, or anhydride, T (II): ethylenically unsaturated, linear or branched hydrocarbon monomer;

T (III): polyoxyalkylenated ester of an ethylenically unsaturated carboxylic acid.

The monomer (I) corresponds more particularly to the following formula:

$$(R^1)(R^1)—C=C(R^1)—COOH \quad (I)$$

in which formula the radicals $R^1$, which are identical or different, represent a hydrogen atom, a $C_1$–$C_{10}$ hydrocarbon radical optionally comprising a —COOH group, a —COOH group.

According to a preferred embodiment of the invention, the monomer of formula (I) is a monocarboxylic or polycarboxylic acid, a carboxylic anhydride corresponding to the following formula:

$$(R^{11})HC=C(R^{12})COOH$$

in which formula:

$R^{11}$ represents a hydrogen atom, a —COOH group or a —$(CH_2)_n$—COOH group in which n is between 1 and 4, a $C_1$–$C_4$ alkyl radical;

$R^{12}$ represents a hydrogen atom, a —$(CH_2)_m$—COOH group in which m is between 1 and 4, a $C_1$–$C_4$ alkyl radical.

Preferably, $R^{11}$ represents a hydrogen atom, a group —COOH or $(CH_2)$—COOH, a methyl radical, and $R^{12}$ represents a hydrogen atom, a group —$CH_2COOH$ or a methyl radical.

According to a more specific embodiment, the monomer of formula (I) is chosen from acrylic, methacrylic, citraconic, maleic, fumaric, itaconic or crotonic acids or anhydrides.

As regards the monomer of formula (II), the latter corresponds more especially to the following formula:

$$(R^2)(R^2)—C=CH_2 \quad (II)$$

in which formula the radicals $R^2$, which are identical or different, represent a hydrogen atom, a linear or branched aliphatic, or cyclic, saturated or ethylenically unsaturated $C_1$–$C_{10}$ radical.

More particularly, the said radicals $R_2$, which are identical or different, represent a hydrogen atom, a saturated, linear or branched aliphatic, or cyclic, $C_1$–$C_{10}$ radical.

Preferably, the said monomer of formula (II) is chosen from ethylene, propylene, 1-butene, isobutylene, n-1-pentene, 2-methyl-1-butene, n-1-hexene, 2-methyl-1-pentene, 4-methyl-1-pentene, 2-ethyl-1-butene, diisobutylene (or 2,4,4-trimethyl-1-pentene), 2-methyl-3,3-dimethyl-1-pentene.

As for the monomer (III), it corresponds more particularly to the following formula:

$$CH_2=C(R^3)—C(O)—O—[CH_2CH(R^4)O]_m—[CH(R^5)—CH_2O]—^6$$

in which formula:

$R^3$ is a hydrogen atom or a methyl radical, $R^4$ and $R^5$, which are identical or different, represent a hydrogen atom or an alkyl radical containing from 1 to 4 carbon atoms, $R^6$ is an alkyl, aryl, alkylaryl or arylalkyl radical containing from 1 to 30, preferably from 8 to 30 carbon atoms, n is between 2 and 100, preferably between 6 and 100 m is between 0 and 50, with the proviso that n is greater than or equal to m and their sum is between 2 and 100, preferably between 6 and 100.

Preferably, monomers of formula (III) are used for which $R^6$ is an alkyl radical containing from 8 to 30 carbon atoms, or a phenyl radical substituted with one to three 1-phenylethyl groups, or an alkylphenyl radical in which the alkyl radical contains from 8 to 16 carbon atoms.

Among the monomers of this type, which may be used, there may be mentioned those described in patents EP 705 854, U.S. Pat. No. 4,138,381 or U.S. Pat. No. 4,384,096.

The polymer obtained by reaction of the monomers (I) and (III), and optionally (II), is preferably obtained by free-radical polymerization.

According to a second embodiment, the polymer (i) is obtained by polymerization of at least one monomer (I) and at least one monomer (II').

What was indicated above relating to the monomer (I) remains valid and will not therefore be repeated in this part of the description.

As regards more specifically the monomer of formula (II'), the formula is the following:

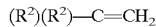

in which formula the radicals $R^2$, which are identical or different, represent a hydrogen atom, a linear or branched aliphatic, or cyclic, saturated or ethylenically unsaturated, $C_2$–$C_{10}$ radical, provided that the two radicals are not hydrogen atoms. More More particularly, the said radicals $R^2$, which are identical or different, represent a hydrogen atom, a linear or branched aliphatic, or cyclic, saturated $C_2$–$C_{10}$ radical, provided that the two radicals are not hydrogen atoms.

Preferably, the said monomer of formula (II) is chosen from 1-butene, isobutylene, n–1-pentene, 2-methyl-1-butene, n–1-hexene, 2-methyl-1-pentene, 4-methyl-1-pentene, 2-ethyl-1-butene, diisobutylene (or 2,4,4-trimethyl-1-pentene), 2-methyl-3,3-dimethyl-1-pentene.

According to a particularly advantageous embodiment of the present invention, the copolymer of formula (i) is derived from the polymerization of maleic anhydride and diisobutylene.

It is specified that the polymer (i) is obtained more particularly by carrying out a freeradical polymerization of the monomers (I) and (II').

It should be noted that these compounds are well known to persons skilled in the art. By way of copolymers of this type, there may be mentioned that marketed under the name Geropon® T36 (maleic anhydride/diisobutylene) marketed by Rhodia Chemie, as well as Sokalan® CP9 (maleic anhydride/olefin) marketed by BASF.

As a guide, and regardless of the embodiment used for the polymer (i), the weight-average molecular mass of these polymers is more particularly less than 20 000 g/mol.

It is specified that the molecular mass of the polymer as well as the respective proportions of the monomers (I), (II), (II') and (III), depending on their presence, are such that the resulting polymer does not precipitate when it is in an aqueous solution with the nonionic surfactant, the polymer concentration being between 0 excluded and 90% by weight, preferably between 30 and 80% by weight.

Finally, it should be noted that the polymer (i) may be present in a partially or completely neutralized form. This operation preferably takes place after the polymerization.

A second variant of the present invention consists of the use, as water-soluble or water-dispersible compound, of at least one polymer derived from the polymerization of at least one monomer of formula (I) as defined above and comprising, in addition, at least one saturated or unsaturated, aromatic or nonaromatic, hydrophobic $C_4$–$C_{30}$ hydrocarbon graft, optionally interrupted by one or more heteroatoms.

All that has been indicated above in relation to the monomer of formula (I) remains applicable in the case of the polymer (ii) and will therefore not be repeated here.

More particularly, the monomer (I) is chosen from acrylic, methacrylic, citraconic, maleic, fumaric, itaconic and crotonic acids or anhydrides.

Moreover, the hydrophobic graft is chosen from aliphatic, cyclic, aromatic, alkylaromatic and arylaliphatic radicals comprising 4 to 30 carbon atoms, and which may be interrupted by one or more heteroatoms, preferably oxygen.

More particularly, the grafts are linked to the backbone of the polymer by means of ester and/or amide groups.

Such graft polymers are obtained using methods known to persons skilled in the art, consisting, in a first instance, in polymerizing, preferably by the free-radical route, the monomer(s) (I), and then in reacting a portion of the free carboxyl functional groups with reagents chosen in particular from hexyl, heptyl, lauryl or behenyl amines or alcohols, which are optionally ethoxylated and/or propoxylated, mono-, di- or tristyrylphenols which are optionally ethoxylated and/or propoxylated.

As a guide, the weight-average molecular mass of the polymers (ii) is more particularly less than 20 000 g/mol.

However, the molecular mass as well as the respective proportions of monomer(s) (I) and of hydrophobic grafts is such that the resulting polymer does not precipitate when it is in aqueous solution with the nonionic surfactant, the polymer concentration being between 0 exluded and 90% by weight, preferably between 30 and 80% by weight.

The polymers (ii) may also be present in a partially or completely neutralized form. This operation preferably takes place after the polymerization.

The polymers (i) and (ii) may, in addition, comprise units corresponding to monoethylenically unsaturated nonionic monomers (IV) other than the monomers (II) and (II').

Among the monoethylenically unsaturated nonionic monomers (IV), there may be mentioned:

vinylaromatic monomers such as styrene, vinyltoluene, $C_1$–$C_{20}$ alkyl esters of acids which are α-β-ethylenically unsaturated, such as methyl, ethyl or butyl acrylates or methacrylates, vinyl or allyl esters of acids which are α-β-ethylenically unsaturated, such as vinyl or allyl acetates or propionates, vinyl or vinylidene halides such as vinyl or vinylidene chloride, α-β-ethylenically unsaturated nitriles such as acrylonitrile, hydroxyalkyl esters of acids which are α-β-ethylenically unsaturated, such as hydroxyethyl or hydroxypropyl acrylates or methacrylates, α-β-ethylenically unsaturated amides such as acrylamide or methacrylamide.

If such monomers are present, the polymerization takes place in their presence.

A third variant of the present invention consists in using, as water-soluble or water-dispersible compound, at least one polypeptide of natural or synthetic origin, comprising at least one saturated or unsaturated, aromatic or nonaromatic, hydrophobic $C_4$–$C_{30}$ hydrocarbon graft, optionally interrupted by one or more heteroatoms.

The peptide polymers of natural or synthetic origin are homopolymers or copolymers derived from the polycondensation of amino acids, in particular aspartic and glutamic acid or precursors of diamino diacids, and hydrolysis. These polymers may either be homopolymers derived from aspartic or glutamic acid, copolymers derived from aspartic acid and glutamic acid in any proportions, or copolymers derived from aspartic and/or glutamic acid and other amino acids. Among the copolymerizable amino acids, there may be mentioned, inter alia, glycine, alanine, leucine, isoleucine, phenylalanine, methionine, histidine, proline, lysine, serine, threonine, cysteine, and the like.

Among the polypeptides of natural origin, there may be mentioned water-soluble or water-dispersible proteins of plant or animal origin. The proteins of plant origin are preferably protein hydrolysates. Their degree of hydrolysis is more particularly less than 40%.

Among the proteins of plant origin, there may be mentioned, as a guide, the proteins obtained from high-protein seeds, in particular those from peas, field beans, lupin, haricot beans and lentil; proteins obtained from seeds of cereals, in particular those of wheat, barley, rye, maize, rice, oats, millet; the proteins obtained from oil-bearing seeds, in particular those of soya bean, groundnut, sunflower, rape and coconut; the proteins obtained from leaves, in particular lucerne and nettle; the proteins obtained from plant organs and underground storage organs, in particular those of potato and beet.

Among the proteins of animal origin there may be mentioned, for example, muscle proteins, in particular stromal proteins, gelatin; proteins obtained from milk, in particular casein, lactoglobulin; and fish proteins.

The proteins of plant origin, and more particularly the proteins obtained from soya bean and wheat are preferred.

What was indicated above in relation to the nature of the hydrophobic graft remains valid and will not be repeated here.

It should be noted that the hydrophobic grafts may be linked to the polypeptide by means of amide, ester, urea, urethane, isocyanate or amino bonds.

The graft polymers are obtained by reacting, on the one hand, free acid or amine functional groups with compounds which make it possible to create the abovementioned bonds.

The preferred compounds exhibit a degree of low polymerization. More particularly, by way of illustration, the weight-average molecular mass is less than 20 000 g/mol.

It is specified that the molecular mass of the polymer, as well as the proportion of graft relative to the polypeptide, are such that the resulting polymer does not precipitate when it is in aqueous solution with the nonionic surfactant, the polymer concentration being between 0 excluded and 90% by weight, preferably between 30 and 80% by weight.

According to a last variant of the present invention, the water-soluble or water-dispersible compound is chosen from highly depolymerized polysaccharides comprising a saturated or unsaturated, aromatic or nonaromatic, hydrophobic $C_4$–$C_{30}$ hydrocarbon graft, optionally interrupted by one or more heteroatoms.

Such compounds are in particular described in the book by P. ARNAUD entitled "cours de chimie organique", GAUTHIER-VILLARS publishers, 1987.

By way of nonlimiting example of highly depolymerized polysaccharides, there may be mentioned those obtained from dextran, starch, maltodextrin, xanthan gum and galactomannan such as guar or carob.

These polysaccharides preferably have a melting point greater than 100° C. and a water-solubility between 50 and 500 g/l.

On the subject of the hydrophobic grafts, reference may be made to what was indicated above.

It should be noted that the hydrophobic grafts may be linked to the polysaccharide by means of ester, amide, urea, urethane, isocyanate or amino bonds.

The graft polymers are obtained by reacting a portion of the free acid or alcohol functional groups with compounds which make it possible to create the abovementioned bonds.

More particularly, by way of illustration, the weight-average molecular mass of these polymers is less than 20 000 g/mol.

However, it is specified that the molecular mass of the depolymerized polymer, as well as the proportion of graft relative to the polysaccharide are such that the resulting polymer does not precipitate when it is in aqueous solution with the nonionic surfactant, the polymer concentration being between 0 excluded and 90% by weight, preferably between 30 and 80% by weight.

Of course, it is quite possible to envisage using these various types of water-soluble or water-dispersible compounds in combination.

The redispersible granules of the present invention may contain, in addition, an additional ionic surfactant.

The additional ionic surfactants may be more particularly amphoteric surfactants, alkylbetaines, alkyldimethylbetaines, alkylamidopropylbetaines, alkylamidopropyldimethylbetaines, alkyltrimethylsulfobetaines, imidazoline derivatives such as alkyl amphoacetates, alkyl amphodiacetates, alkyl amphopropionates, alkyl amphodipropionates, alkyl sultaines or alkylamidopropylhydroxysultaines, the products of condensation of fatty acids and protein hydrolysates, amphoteric derivatives of alkylpolyamines such as Amphionic XL® marketed by Rhodia, Ampholac 7T/X® and Ampholac 7C/X® marketed by Berol Nobel.

The granules according to the invention may, in addition, comprise at least one additional anionic surfactant.

There may be used, for this purpose, water-soluble salts of alkyl sulfates and of alkyl ether sulfates, alkyl isethionates and alkyl taurates or their salts, alkyl carboxylates, alkyl sulfosuccinates or alkyl succinamates, alkyl sarcosinates, alkylated derivatives of protein hydrolysates, acyl aspartates, phosphate esters of alkyl and/or alkyl ether and/or alkyl aryl ether.

The cation is in general an alkali or alkaline-earth metal, such as sodium, potassium, lithium, magnesium, or an ammonium group $NR_4^+$ with R, which are identical or different, representing an alkyl radical which is substituted or otherwise with an oxygen or nitrogen atom.

It is possible to add to the redispersible granules according to the invention any conventional additive according to the field of application of these granules.

As was indicated above, the redispersible granules according to the invention have high contents of active substance.

Thus, the content of active substance is advantageously between 40 and 90 parts by weight in the granule. According to a particular embodiment of the: invention, the content of active substance is greater than 50 parts by weight.

The quantity of nonionic surfactant and of water-soluble or water-dispersible compound varies more particularly between 10 and 60 parts by weight in the granule.

The weight ratio of the concentrations between the nonionic surfactant and the water-soluble or water-dispersible compound may vary in a wide range. However, according to a particularly advantageous embodiment of the invention, the weight ratio of the concentrations is between 50/50 and 90/10.

In the case where the redispersible granules of the invention comprise at least one additional surfactant, the weight ratio of the concentrations between the nonionic surfactant and the additional surfactant is between 5 and 10.

The method of preparing the redispersible granules will now be described.

As indicated above, the method consists, in a first step, in preparing an emulsion in water, of at least one active substance, of at least one nonionic surfactant, of at least one water-soluble or water-dispersible compound.

The emulsion may also comprise at least one additional surfactant, if such a compound is used.

Quite obviously, in the case where conventional additives are used, they may be added during the formation of the emulsion.

All the methods of preparing emulsions known to persons skilled in the art and described, for example, in "ENCYLCOPEDIA of EMULSIONS TECHNOLOGY", volumes 1 to 3 by Paul BECHER, published by MARCEL DEKKER INC., 1983, may be used in the context of the present invention.

Thus, the so-called direct phase emulsification method is suitable for the preparation of the granules according to the invention. It is briefly recalled that this method consists in preparing a mixture containing water and the surfactant(s), including the water-soluble or water-dispersible compound, and then in introducing the active substance in liquid form, with stirring.

Another suitable method is phase inversion emulsification. According to this route, the active substance is mixed with an nonionic surfactant and the water, which may contain the other constituents such as the water-soluble or water-dispersible compound for example, is introduced dropwise and with stirring. From a certain quantity of water introduced, inversion of the emulsion occurs. A direct oil-in-water emulsion is thus obtained. The emulsion obtained is then diluted in water so as to obtain an appropriate volume fraction in dispersed phase.

It is finally possible to prepare the emulsion using colloid mills such as MENTON GAULIN and MICROFLUIDIZER (MICROFLUIDICS).

The mean particle size of the emulsion is in general between 0.1 and 10 micrometers, and preferably between 0.2 and 5 micrometers.

The emulsification may be carried out at a temperature close to room temperature, although lower or higher temperatures may be envisaged. The quantity of dry matter in the emulsion is generally between 10 and 99% by weight, and preferably between 30 and 80% by weight.

The respective contents of various consistuents are chosen such that the dried granules have the composition defined above.

The second stage of the method of preparation according to the invention consists in drying the emulsion thus formulated so as to obtain granules.

The method used to remove the water from the emulsion and to obtain granules may be carried out by any means known to persons skilled in the art.

Thus, according to a first embodiment of the invention, it is possible to envisage drying in an oven. Preferably, this drying takes place in a thin layer.

Usually, the drying temperature is less than or equal to 100° C. More particularly, temperatures between 50 and 90° C. are suitable for carrying out this method.

According to another particular embodiment of the invention, a method for the so-called rapid drying of the emulsion is carried out.

Spray-drying or drying using Duprat® drums, lyophilization (freezing-sublimation) are suitable in this regard.

These modes of drying, such as in particular spray-drying, are particularly recommended because they make it possible to preserve the emulsion as it is and to obtain the granules directly.

The spray-drying may be carried out in a customary manner in any known apparatus, such as for example a spray-drying tower combining spraying carried out using a nozzle or a turbine with a stream of hot gas.

The hot gas admission temperature (in general air), at the top of the column, is preferably between 100 and 115° C. and the outlet temperature is preferably between 55 and 65° C. These temperatures are given as a guide, and depend on the heat-stability of the various components.

In the case of operations for drying the emulsion which are carried out by means of a Duprat® drum, or any means which make it possible to rapidly obtain a dry film which is separated from the drying support by a scraping operation, for example, particles are obtained which may be optionally ground. If necessary, these particles may be the subject of subsequent processing, such as an agglomeration stage, so as to obtain granules.

It should be noted that additives, such as anticaking agents, may be incorporated into the granules during this second drying stage.

It is recommended, by way of example, to use a filler chosen in particular from calcium carbonate, barium sulfate, kaolin, silica, bentonite, titanium oxide, talc, hydrated alumina and calcium sulfoaluminate.

A concrete but nonlimiting example will now be presented.

EXAMPLE 3.2 g of Soprophor® CY8 (ethoxylated tristyrylphenol 25 OE) and 0.5 g of $Na_2CO_3$ are added to 56 g of an aqueous solution of Geropon® T 36 (at 26.3%), with stirring by means of a frame-type blade (250 revolutions/minute).

Once a homogeneous mixture has been obtained, 18.5 g of Metolachlor are added.

The mixture is then stirred for 2 minutes using the frame-type blade (1 000 revolutions/minute).

At the end of this operation, an emulsion is obtained which is dried at 70° C. in a thin layer for a period which is sufficient to obtain a dry film.

The film is then ground to give particles which are then sieved so as to obtain the desired particle size distribution.

The particles contain 50.1% of metolachlor.

The particles become spontaneously redispersed and are converted to an emulsion when they are brought into contact with water.

COMPARATIVE EXAMPLE 3.2 g of Soprophor® CY8 (ethoxylated tristyrylphenol 25 OE) and 0.5 g of $Na_2CO_3$ are added to 56 g of an aqueous solution of Geropon® HB (sodium polyacrylate at 26.3%), with stirring by means of a frame-type blade (250 revolutions/minute).

Once a homogeneous mixture has been obtained, 18.5 g of Metolachlor are added.

The mixture is then stirred for 2 minutes using the frame-type blade (1 000 revolutions/minute).

At the end of this operation, a very unstable emulsion is obtained which coalesces rapidly and separates into two phases.

It is impossible to dry this emulsion in a thin layer in a homogeneous manner.

What is claimed is:

1. Water-redispersible granules obtained by carrying out the steps of:
   a) preparing an emulsion, in water, of at least one active substance, at least one nonionic surfactant, and at least one water-soluble or water-dispersible compound, and
   b) drying the emulsion obtained in step a) to obtain the granules, the active substance being in the form of a hydrophobic liquid, the nonionic surfactant being a polyoxyalkylenated derivative, and the water-soluble or water-dispersible compound being:
      (i) a polymer obtained by polymerizing at least one monomer (I), at least one monomer (III) and optionally at least one monomer (II), or at least one monomer (I) and at least one monomer (II'), wherein monomer (I) is an ethylenically unsaturated, linear or branched, aliphatic, cyclic or aromatic monocarboxylic or polycarboxylic acid, or anhydride, monomer (II') is an ethylenically unsaturated, linear or branched hydrocarbon, monomer (II') has the following formula $(R^2)(R^2)\!-\!C\!=\!CH_2$, in which radicals $R^2$, which are identical or different, represent a hydrogen atom, or a linear or branched aliphatic, or cyclic, saturated or ethylenically unsaturated $C_2\text{-}C_{10}$ radical, provided that the two $R^2$ radicals are not hydrogen atoms, and monomer (III) is a polyoxyalkylenated ester of an ethylenically unsaturated carboxylic acid;

(ii) a polymer obtained by the polymerization of at least one ethylenically unsaturated, linear or branched, aliphatic, cyclic or aromatic, monocarboxylic or polycarboxylic acid, or anhydride monomer (I) and at least one saturated or unsaturated, aromatic or nonaromatic, hydrophobic $C_4\text{-}C_{30}$ hydrocarbon graft, optionally interrupted by one or more heteroatoms;

(iii) a polypeptide of natural or synthetic origin, comprising at least one saturated or unsaturated, aromatic or nonaromatic, hydrophobic $C_4\text{-}C_{30}$ hydrocarbon graft, optionally interrupted by one or more heteroatoms; or (iv) a highly depolymerized polysaccharide comprising at least one saturated or unsaturated, aromatic or nonaromatic, hydrophobic $C_4\text{-}C_{30}$ hydrocarbon graft, optionally interrupted by one or more heteroatoms.

2. Granules according to claim 1, wherein the (i) compound is obtained by a process comprising the polymerization of:

at least one monomer having the following formula (I):

$$(R^1)(R^1)\!-\!C\!=\!(R^1)\!-\!COOH \quad (I)$$

wherein radicals $R^1$, which are identical or different, represent a hydrogen atom, or a $C_1\text{-}C_{10}$ hydrocarbon radical optionally comprising a —COOH group, a —COOH group; and at least one monomer having the following formula (II'):

$$(R^2)(R^2)\!-\!C\!=\!CH_2 \quad (II')$$

wherein radicals $R^2$, which are identical or different, represent a hydrogen atom, or a linear or branched aliphatic, or cyclic, saturated or ethylenically unsaturated, $C_2\text{-}C_{10}$ radical, provided that the two radicals are not hydrogen atoms.

3. Granules according to claim 1, wherein the monomer (I) of the (i) compound or the (ii) compound is a monocarboxylic or polycarboxylic acid, or a carboxylic anhydride, having to the following formula:

$$(R^{11})HC\!=\!C(R^{12})COOH$$

wherein $R^{11}$ represents a hydrogen atom, a —COOH group, a group —$(CH_2)_n$—COOH in which n is between 1 and 4, or a $C_1\text{-}C_4$ alkyl radical, and $R^{12}$ represents a hydrogen atom, a group —$(CH_2)_m$—COOH in which m is between 1 and 4, or a $C_1\text{-}C_4$ alkyl radical.

4. Granules according to claim 3, wherein $R^{11}$ represents a hydrogen atom, a group —COOH, a group —$(CH_2)$—COOH, or a methyl radical, and the radical $R^{12}$ represents a hydrogen atom, a group —$CH_2$—COOH or a methyl radical.

5. Granules according to claim 3, wherein the monomer (I) is a acrylic, methacrylic, citraconic, maleic, fumaric, itaconic or crotonic acid or anhydride.

6. Granules according to claim 1, wherein the monomer (II') is 1-butene, isobutylene, n-1-pentene, 2-methyl-1-butene, n-1-hexene, 2-methyl-1-pentene, 4-methyl-1-pentene, 2-ethyl-1-butene, diisobutylene or 2-methyl-3,3-dimethyl-1-pentene.

7. Granules according claim 1, wherein the (i) compound is obtained by polymerizing maleic anhydride and diisobutylene.

8. Granules according to claim 1, characterized in that the nonionic surfactant is an ethoxylated or ethoxypropoxylated fatty alcohol, an ethoxylated or ethoxypropoxylated triglyceride, an ethoxylated or ethoxypropoxylated fatty acid, an ethoxylated or ethoxypropoxylated sorbitan ester, an ethoxylated or ethoxypropoxylated fatty amine, an ethoxylated or ethoxypropoxylated di(1-phenylethyl)phenol, an ethoxylated or an ethoxy-propoxylated tri(1-phenylethyl)phenol, an ethoxylated or ethoxy-propoxylated alkylphenol.

9. Granules according to claim 1, wherein the emulsion further comprises at least one additional ionic surfactant.

10. Granules according to claim 1, characterized in a content of active substance between 40 and 90 parts by weight in the granule.

11. Granules according to claim 1, characterized in a quantity of nonionic surfactant and of water-soluble or water-dispersible compound between 10 and 60 parts by weight in the granule.

12. Granules according to claim 1, characterized in a weight ratio of concentrations between the nonionic surfactant and the water-soluble or water-dispersible compound being between 50/50 and 90/10.

13. Granules according to 1, characterized in a weight ratio the concentrations between the nonionic surfactant and the additional surfactant(s) being between 5 and 10.

14. Granules according claim 1, wherein the emulsion comprises 10 to 99% by weight of dry substances.

15. Granules according claim 1, wherein the emulsion comprises 30 to 80% by weight of dry substances.

16. Granules according to claim 1, wherein the drying of step b) is carried out in an oven, in a thin layer.

17. Granules according to claim 1, wherein the drying of step b) is carried out by spray-drying.

18. Granules according to claim 1, wherein the drying of step b) is carried out by means of a Duprat® drum.

19. Water-redispersible granules obtained by carrying out the steps of:

a) preparing an emulsion, in water, of at least one active substance, at least one nonionic surfactant, and at least one water-soluble or water-dispersible compound, and b) drying the emulsion obtained in step a) to obtain the granules, the active substance being in the form of a hydrophobic liquid, the nonionic surfactant being a polyoxyalkylenated derivative, and the water-soluble or water-dispersible compound being:

(i) a polymer obtained by polymerizing at least one monomer (I), and at least one monomer (II'), wherein:

monomer (I) is an ethylenically unsaturated, linear or branched, aliphatic, cyclic or aromatic monocarboxylic or polycarboxylic acid, or anhydride, and monomer (II') has the following formula:

$$(R^2)(R^2)\!-\!C\!=\!CH_2,$$

in which radicals $R^2$, which are identical or different, represent a hydrogen atom, or a linear or branched aliphatic, or cyclic, saturated or ethylenically unsaturated $C_2\text{-}C_{10}$ radical, provided that two $R^2$ radicals are not hydrogen atoms.

20. Granules according to claim 1, wherein polymer (i) is obtained by polymerizing maleic anhydride and diisobutylene.

* * * * *